June 7, 1932.   H. L. MARTIN   1,861,808
UTENSIL HOLDER
Filed May 26, 1930
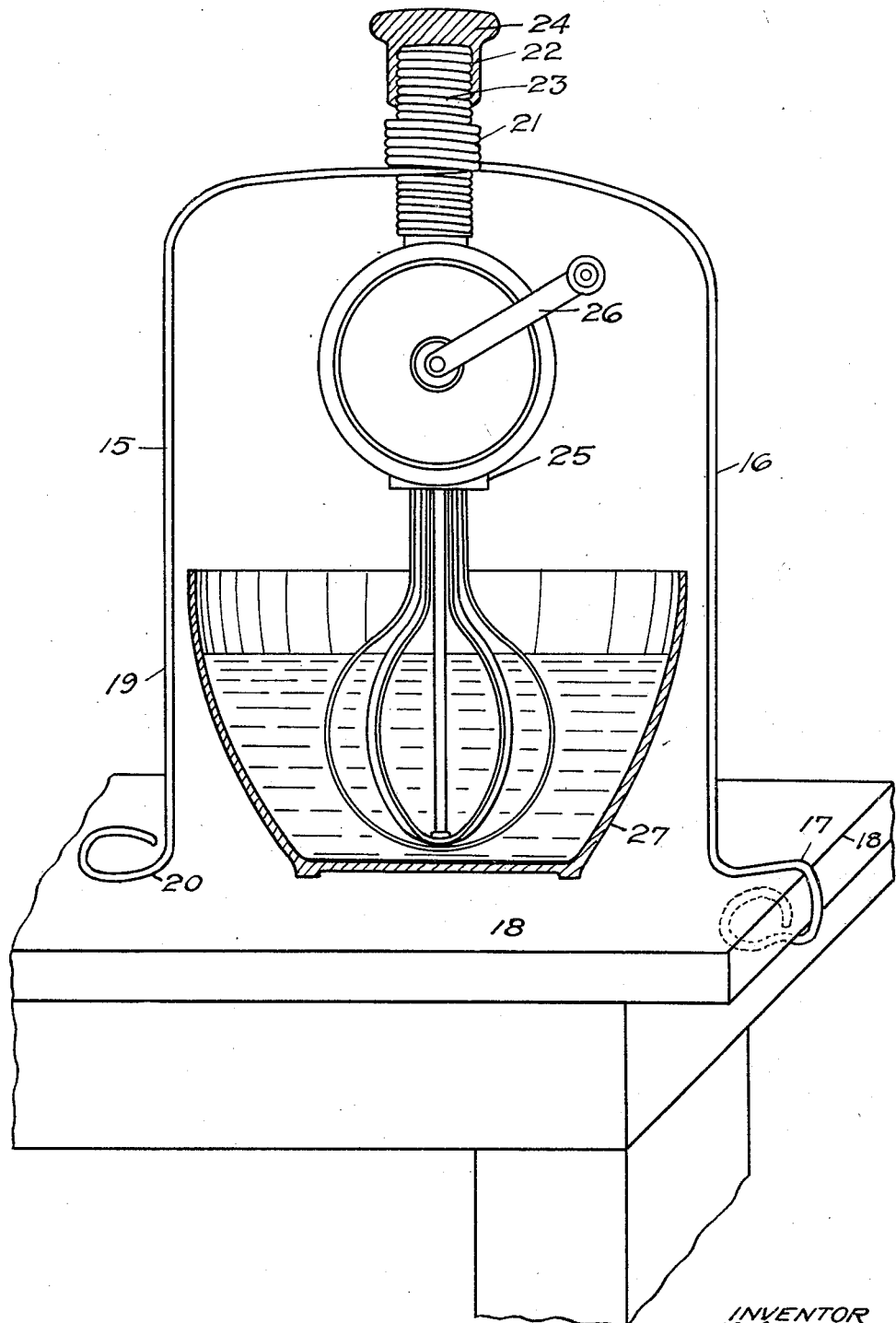
INVENTOR
H. L. Martin.
E. J. Fetherstonhaugh.
ATTORNEY.

Patented June 7, 1932

1,861,808

UNITED STATES PATENT OFFICE

HARRY LIONELL MARTIN, OF CARTIERVILLE, QUEBEC, CANADA

UTENSIL HOLDER

Application filed May 26, 1930. Serial No. 455,624.

The invention relates to a utensil holder, as described in the present specification and illustrated in the accompanying drawing that forms part of the same.

The invention consists essentially in the novel means employed for supporting the utensil while being operated as pointed out in the claims for novelty following a description containing an explanation in detail of an acceptable form of the invention.

The objects of the invention are to facilitate the correct manipulation of the utensil so that the operation of beating eggs or mashing vegetables will be more efficient and consequently produce better results in the preparation of foods; to adjust the utensil to the desired height in respect to the bowl or dish containing the foodstuff either in the beginning or during the operation and thereby beat, shred or mash the foodstuff throughout; to furnish a useful kitchen article at a low cost so as to bring it within the reach of all persons; and generally to provide a durable article for facilitating the use of various hand operated devices.

The drawing illustrates an elevational view of the holder clamped to a table and utilized in supporting an egg beater.

Referring to the drawing, the numeral 15 indicates a wire loop or a loop of any material in strip form capable of supporting the operated device.

The holder is here shown of wire having the bends at the lower end of a leg 16 forming the clamp 17 in the form of a socket for receiving the table edge, that is to say, the top 18 of the table extends into the socket and is gripped by the clamp.

The other leg 19 terminates in the foot 20 which ordinarily is on a slightly lower plane than the top wire of the clamp 17 therefore when the clamp grips the table the foot 20 is brought down just hard enough on the surface of the top 18 to materially strengthen the grip of the clamp to the table.

The loop at the other end extends from the spirals 21 which form a sleeve and the said spirals form a thread into which the utensil handle is introduced.

The utensil handle 22 is made with a round thread 23 which screws with a twist through the spirals or sleeves 21 and this handle is securely attached to the utensil and replaces the ordinary round handle.

The rubber cap 24 is mounted on the screw threaded handle at the upper end and this cap is finished off to be held comfortably in the palm of the hand.

The egg beater 25 is shown as the hand operated device and the said threaded handle is mounted thereon and preferably forms a permanent feature thereof, in fact any utensil or tool that is suitable may have a handle such as described.

The egg beater operating handle 26 is shown but none of the mechanism, as the said mechanism and the beaters are conventional to that type of beater.

The bowl 27 is illustrated as straddled by the holder and in the operation of the invention the utensil is adjusted as to the height by turning the handle in the spiral form of sleeve and when the proper adjustment has been made with the holder attached to the table one hand is laid on the cap handle and the other is used to operate the utensil or if it is found more convenient one hand may be used for holding the bowl as the holder itself will keep the utensil steady.

Many different kinds of utensils may be inserted in the spiral sleeve and further this sleeve may be of sheet metal with round threads, in fact the construction of the details will largely depend on the necessity of low costs and mass production.

What I claim is:

1. In utensil holders, a wire having central twists forming a spiral sleeve and bent downwardly from the other side of said sleeve to form a loop or stand terminating at the lower ends on the one side in a foot and on the other side in a clamp adapted to grip the table.

2. In a utensil holder, an inverted U-shaped wire stand terminating at its lower ends in a foot on one leg and a table grip on the other and at the upper end forming in the middle a recess adapted to grip a handle.

Signed at Montreal, Canada, this 2nd day of May 1930.

HARRY LIONELL MARTIN.